Feb. 22, 1927.
J. G. DAVIES
1,618,863
MEANS FOR ADVERTISING WARES
Filed Nov. 18 1925      2 Sheets-Sheet 1
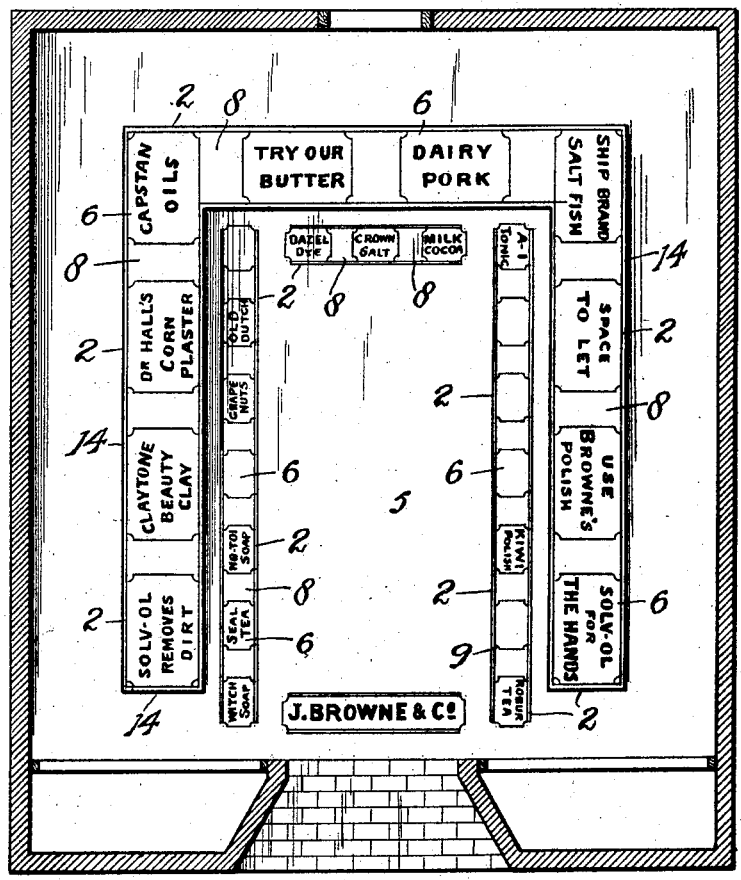
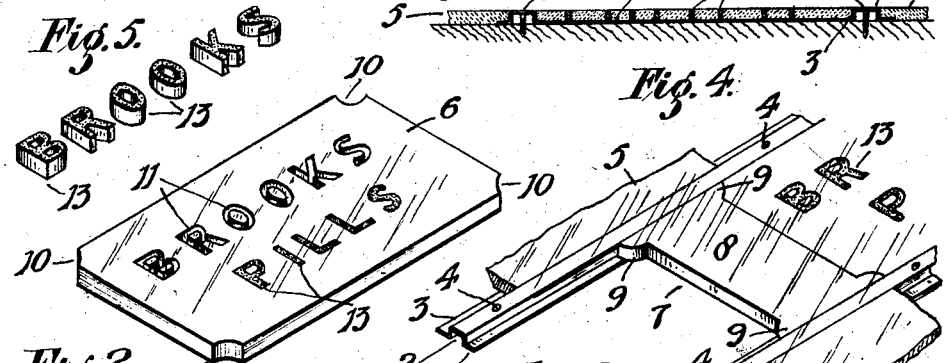

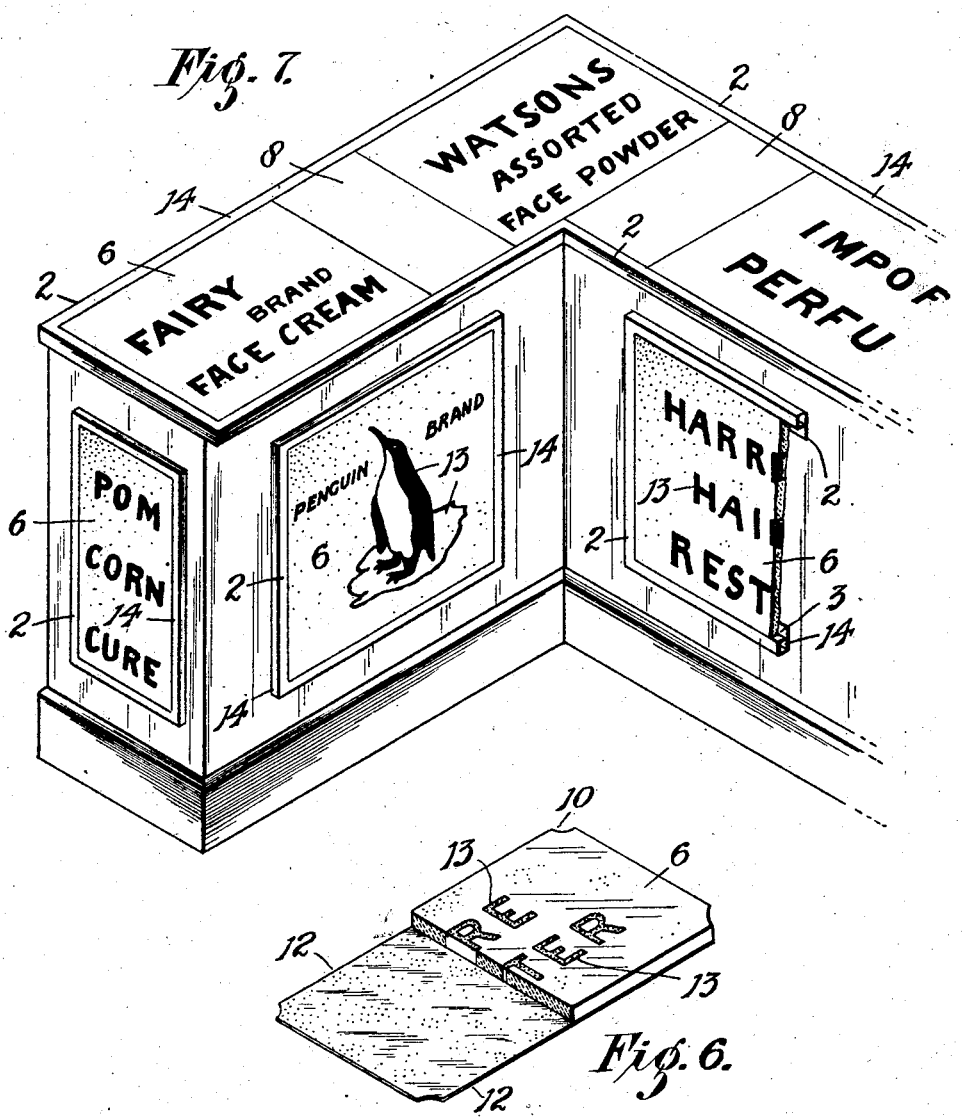

Patented Feb. 22, 1927.

1,618,863

UNITED STATES PATENT OFFICE.

JAMES GEORGE DAVIES, OF SYDNEY, NEW SOUTH WALES, AUSTRALIA.

MEANS FOR ADVERTISING WARES.

Application filed November 18, 1925. Serial No. 69,903.

This invention relates to a new and improved means for advertising articles of merchandise for sale, and it has been devised to provide means whereby persons prior to and upon entering business establishments will have their attention directed to advertising signs of novel character, which are displayed in attractive and pleasing manner.

According to the invention, there are provided basic sheets of linoleum, rubber or like yielding, non-metallic material covering the floors of business establishments and/or affixed to shop-counters, vending kiosks, and other selected display positions. Formed in said basic or covering sheets are open spaces, into which shaped display strips of the same material as said basic sheets are fitted. Formed in each of these shaped strips are openings, that snugly accommodate letters, numerals, devices, or symbols, that are arranged or grouped to provide the required advertising sign. These integers of the advertising sign are also formed of the same material as the basic sheets, and they are of a color or combination of colors contrasting with that of the shaped strips into which they are fitted, so as to thereby provide a very attractive advertisement or sign having inlaid effect.

Flanged rails are secured to the flooring, shop-counter, or other surface to facilitate the correct laying of the basic sheets, and these rails are spaced so as to provide open spaces of correct dimensions to receive the advertising signs, which may be detachably and interchangeably fitted.

According to an adaptation of the invention, the display strips of linoleum, rubber or like material having the inlaid letters, devices, or symbols grouped to provide the advertising signs are let into frames flush with said strips and fastened in spaced relationship to the faces of shop-counters and similar vertical surfaces.

The invention in its applications is illustrated by the accompanying drawings, wherein:—

Figure 1 is a plan view of a business establishment showing the improved advertising means applied to the flooring and counters thereof.

Figure 2 is a perspective view of a detached advertising sign or display strip.

Figure 3 is a perspective view illustrating means for fitting display strips in the spaces between parallel frame forming rails secured to a flooring or like surface.

Figure 4 is a view in section of the arrangement shown in Figure 3.

Figures 5 and 6 are views illustrating the method of making an advertising sign or display strip.

Figure 7 is a perspective view illustrating an application of the invention to the upper surfaces and vertical faces of a shop-counter.

In these views 2 designates parallel rails of inverted U-shape having outward seating flanges 3. These rails are rigidly secured at a required distance apart to a shop flooring, shop-counter or other surface selected for display by the use of screws 4 having their heads countersunk in said rails; the rails thus forming open or skeleton frames, as will be apparent.

Basic sheets 5 of linoleum, rubber or other yielding non-metallic covering material of like character are laid on the flooring or other surface with their ends in abutment with the outer sides of said rails and affixed to the flanges 3 by glue or other adhesive. The height of said rails corresponds to the thickness of the covering sheets 5 so as to provide a flush surface.

Advertising signs consisting of shaped strips 6 of the same material as the covering sheets 5 are secured to the flooring or like surface by being snugly fitted into the space 7 between the parallel rails, with their ends in abutment with the inner surfaces of the rails and affixed by an adhesive to the inward flanges of said rails.

Plain spacing pieces 8 are formed of the same material as said covering sheets 5 and similarly fitted between the rails to separate the display strips 6 whereby the same will be clearly discerned. Said spacing pieces are preferably formed with curved end members 9 to interfit with the corner recesses 10 of the display strips.

The advertising matter is prepared by stamping openings 11 in the display strips and then affixing backing sheets 12 of thin fabric to the undersurface of said strips— see Figure 6.

Stamped letters 13—see Figure 5—or alternatively, devices or symbols, of the same material as the sheets 5 are fitted into the openings 11 and immovably secured therein by the use of an adhesive and by the application of pressure to the sign and its contained letters or symbols, so that a flush surface is presented.

The letters or symbols 13 are of a color or combination of colors contrasting with that of the display strips 6, and distinctive, novel and inlaid effects are thus obtained, such as will cause the attention of the public to be attracted.

The several spaces 7 in a floor covering are preferably of the same dimensions and configuration in order that advertising signs can be interchangeably fitted therein, and similarly the spaces in a counter fixture are of the same dimensions in order that the counter display signs can also be fitted for interchange when desired.

According to the adaptation illustrated in Figure 7, advertising signs 6 having backing sheets 12 are applied to the upper surfaces of a shop-counter in spaced relationship, while those signs arranged on the front faces of said counter resemble raised panels. The advertising signs or display strips are prepared as hereinbefore described with the stamped and fitted letters and/or devices of the same material as said strips, but of contrasting color or colors, and said signs are inserted and affixed in rectangular frames 14 formed by the jointing of rails 2 having inward flanges 3 and affixed by screws to said counter.

What I do claim is:—

An advertising structure, comprising a floor-covering sheet of flexible, non-metallic material having an elongated opening therein and adapted to be secured to a floor; rails secured to the floor and defining the marginal outline of said opening; a plurality of spacing members set transversely in said opening and engaged at their ends with opposite rails; and a plurality of display strips fitting conformably in the spaces between the rails and spacing members with their outer faces flush with those of said members and the covering sheet; each display strip being formed with apertures so shaped as to conjointly constitute advertising indicia and in which are fitted filling members corresponding in shape to the individual elements of such indicia; the covering strip and the several display strips being of the same material and color, and the filling members having an appearance which sharply contrasts with said sheet and strips.

In testimony whereof I affix my signature.

JAMES GEORGE DAVIES.